March 5, 1946.  A. R. CLARK ET AL  2,395,960
AIR WASHING MEANS
Filed Feb. 23, 1943  3 Sheets-Sheet 1
FIG-1-
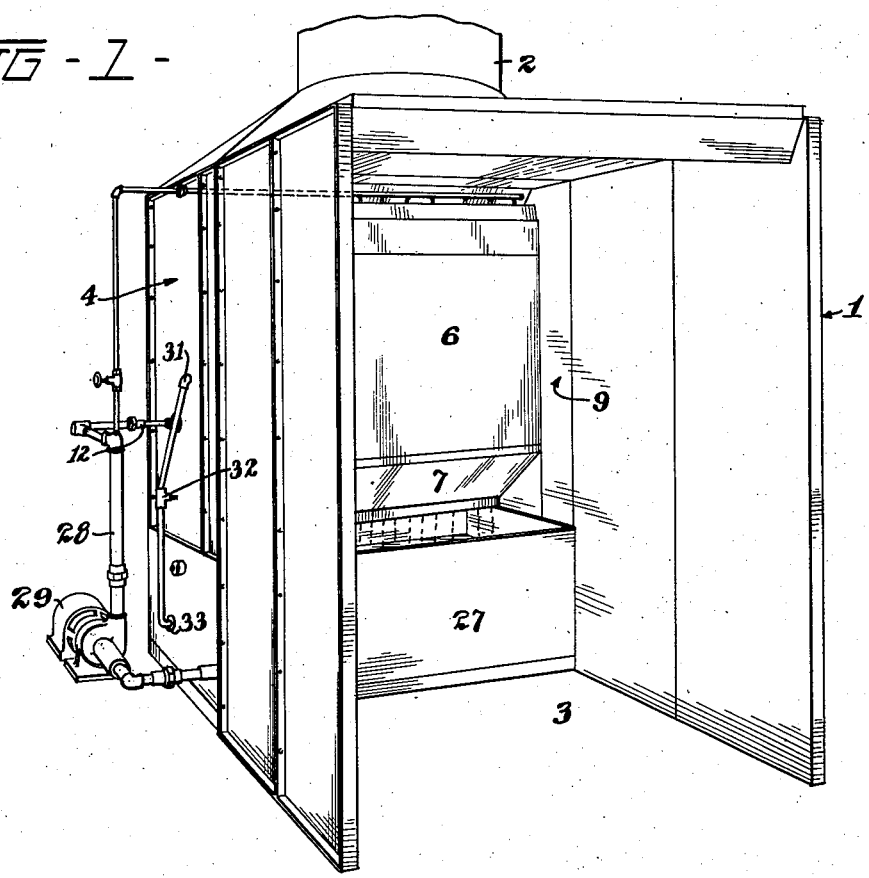
Inventor
ALBERT R. CLARK
JAMES C. BUCK
ROBERT V. DEVRIES
By
Attorney

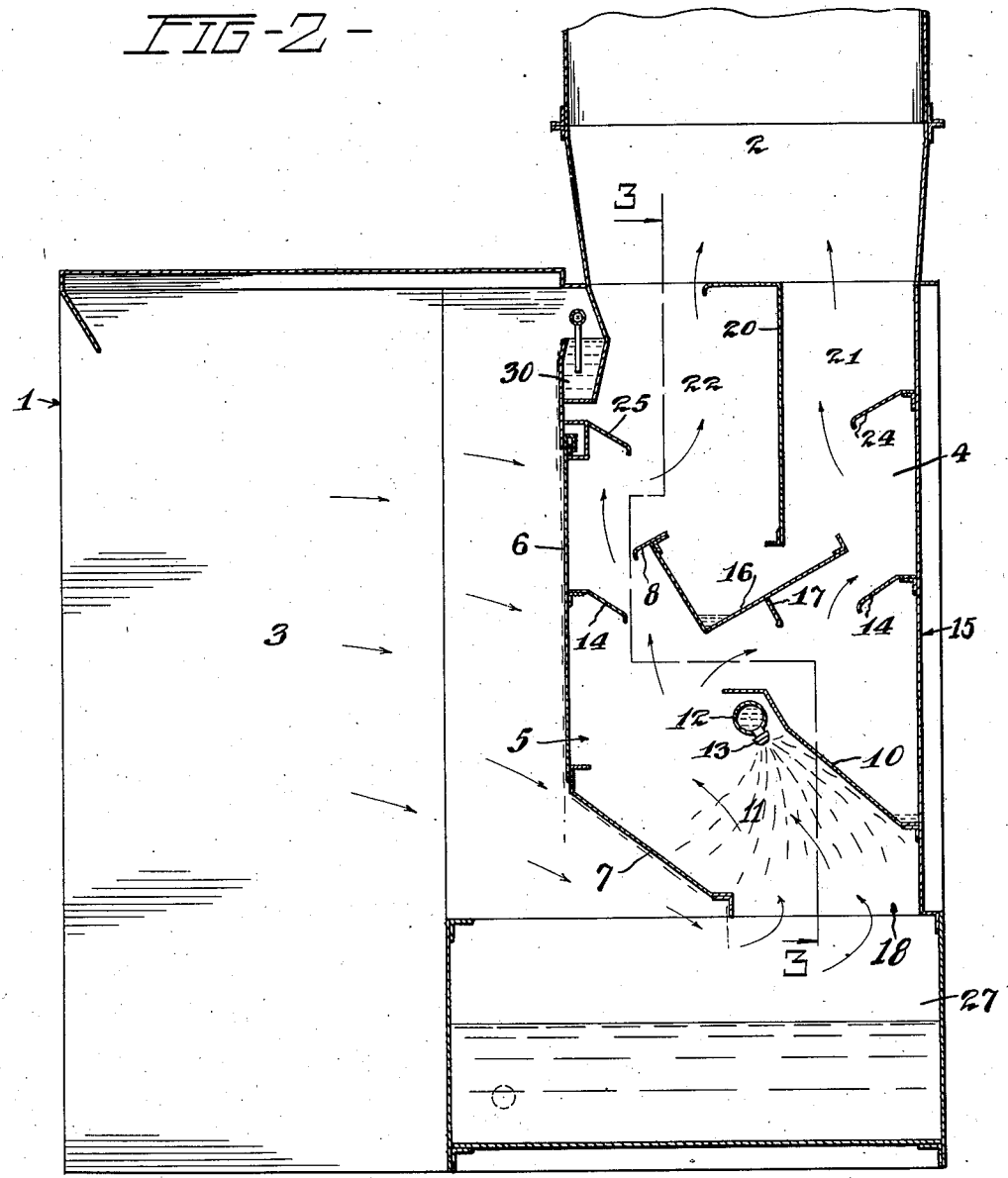

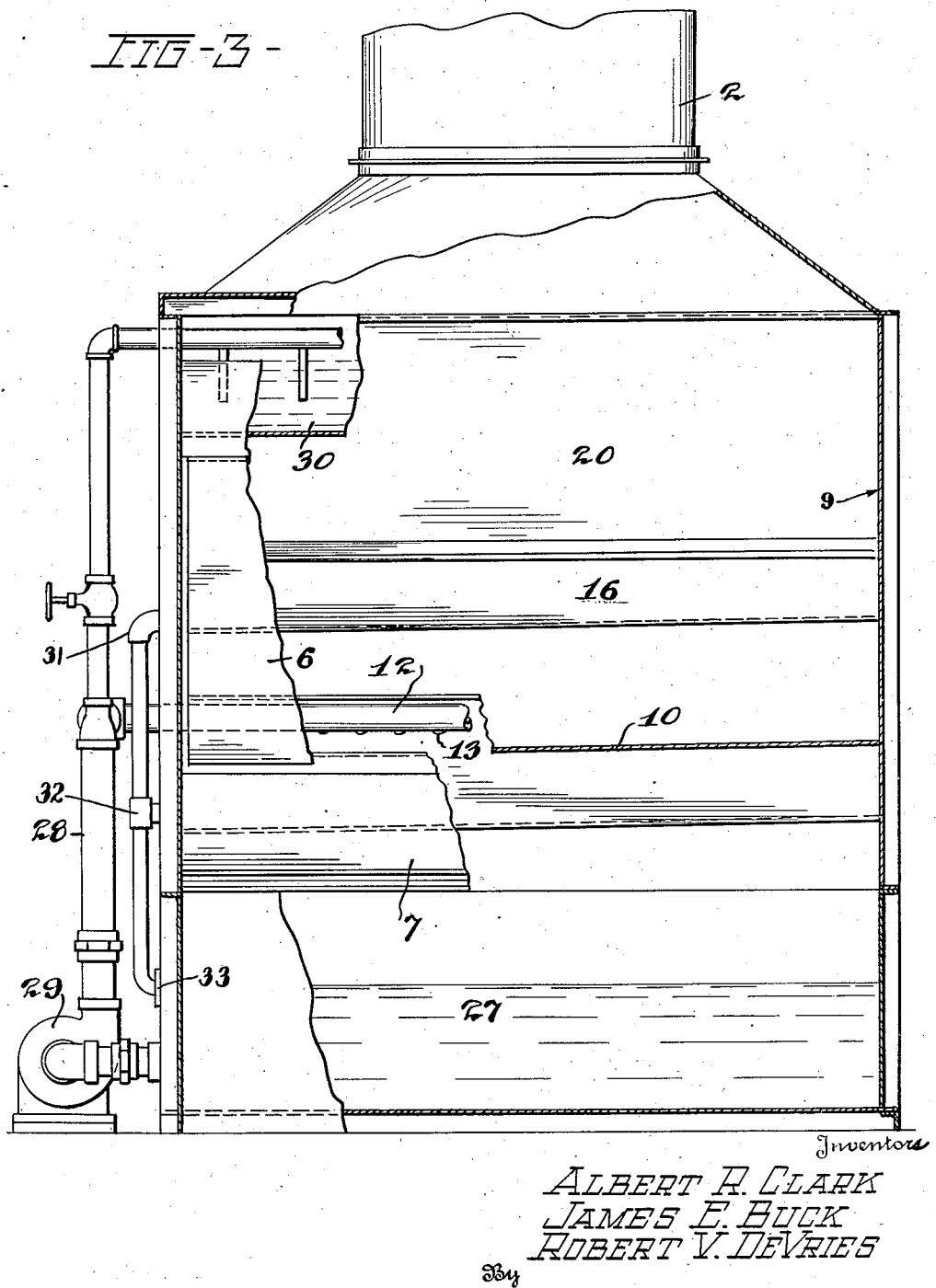

Patented Mar. 5, 1946

2,395,960

UNITED STATES PATENT OFFICE 2,395,960

AIR WASHING MEANS

Albert R. Clark, James C. Buck, and Robert V. De Vries, Toledo, Ohio, assignors to The De Vilbiss Company, Toledo, Ohio, a corporation of Ohio Application February 23, 1943, Serial No. 476,836

5 Claims. (Cl. 183—24)

This invention relates to air washing means and particularly to means of such character adapted for use in connection with paint spraying booths, to wash and remove from the exhausting air the paint particles and their impurities carried thereby during a spraying operation.

It is important, in apparatus of this character, to pass the paint laden air through a water spray and then to act on the moist air to remove the moisture or water droplets therefrom, together with the impurities carried thereby. For the efficient elimination of all paint and other impurities from the air, it is important to cause as much water as possible to be mixed into the air in the form of a fine spray, so that the spray droplets will serve as vehicles for collecting and carrying the impurities, and then to baffle the air to cause the moisture droplets and impurities to collect on the baffle surfaces and to drop therefrom to a trough or troughs by which it is carried to suitable points of discharge. Various apparatus have been used for this purpose, but so far as I am aware, not with the full efficiency desired.

The object of the present invention is the provision of a simple and improved apparatus of this character which has its baffles and passages so shaped and arranged with respect to each other and to the liquid spray discharge as to effect a speedy and highly efficient elimination of the impurities from the air, before passing from the cleaning apparatus, so as to prevent paint particles from reaching the exhaust stack or outside of the building, and also to reduce to a minimum the exhaust of water mist with the air, all of which factors are important to a practical and efficient operation of such an apparatus in connection with the elimination of foreign matter from the air, with parts in full.

The invention is fully described in the following specification, and one embodiment thereof illustrated in the accompanying drawings, in which—

Figure 1 is a rear perspective view of an apparatus embodying the invention; Fig. 2 is a central longitudinal section thereof, and Fig. 3 is a cross-section thereof on the line 3—3 in Fig. 2.

Referring to the drawings, 1 designates a spray booth of the type commonly used in connection with the spray painting of small portable articles and has its body of tunnel form, being rectangular in cross-section, with its rear end open and its forward end closed, except for the provision of an exhaust flue 2 leading from the top of the booth at such forward end. Means (not shown) is provided for effecting an exhaust of air from the booth through said flue.

The communication between the interior or spraying chamber 3 of the booth and the exhaust 2 is through an air cleaning or washing chamber 5, which preferably is coextensive in width with the booth and of rectangular form in horizontal cross-section. This chamber opens at its lower end into the booth chamber 3, as hereinafter described, and at its upper end into the exhaust flue 2, and in the present instance is shown as disposed entirely within the front portion of the booth.

The chamber 5, in the present embodiment of the invention, has its front and side walls formed by the front and side walls, respectively, of the booth, and is separated at its rear from the interior of the booth by a partition at rear wall 6 extending from one side wall 4 to the other side wall 9 of the booth and having closed connection at its top with the top wall of the booth at the rear of the flue 2. The rear wall 6 terminates at its lower end a greater or less distance above the booth floor as may be desired, and has a bottom extension 7 projecting forwardly and downwardly therefrom at approximately a 30° incline to a horizontal. This extension terminates short of the front wall 15 of the booth to form a substantially horizontal entrance opening 18 from the booth to the chamber 5. A baffle plate 10 extends rearwardly and upwardly from the front wall 15 of the chamber 5 in upwardly spaced substantially parallel relation to the bottom extension 7 to cooperate therewith to form an upwardly and forwardly directed throat 11. The rear edge of the baffle plate 10 terminates over the extension 7 substantially midway of the front and rear walls 6 and 15 of the chamber 5 and has a slight upward offset along such edge which receives a cross pipe 12 from which water is discharged in spray-form rearwardly and downwardly into said throat 11 from a row of jets 13. This water spray entirely fills the throat 11 so as to cause all air passing through the throat to pick up and carry the maximum moisture content therewith into the baffle chamber 5.

An intermediate baffle flange 14 projects into the baffle chamber 5 from each of the front and rear walls thereof in horizontal opposed relation and a short distance above the top edge plane of the baffle plate 10, so that the cross-sectional area of the chamber 5 is restricted at such point. The intermediate baffle 14 at the opposite side of the chamber to the baffle plate 10 is substantially in the plane of inclination of such partition.

Baffle means comprising a combination air baffle and drainage trough 16, of angular form in cross-section taken lengthwise of the booth, is disposed slightly above the opening or passageway between the two intermediate baffles 14 and in position to intercept all of the air passing therethrough. The trough side of this member is disposed upward and its side walls or plates form an angle preferably slightly greater than a right angle, with the rear wall shorter than the front wall and disposed at substantially a 58° angle to a horizontal, while the front wall is disposed at substantially a 28° angle to a horizontal. The apex of the angle formed by the baffle means 16 is substantially in the horizontal plane of the passageway between the two intermediate baffles 14 and preferably slightly rearwardly of its center. A baffle flange 17 projects at right angles from the under side of the forward side wall or plate of the baffle means 16, while a lip flange 8 projects at right angles from the upper edge of the rear wall or plate of said member, and, in the present instance, toward the adjacent intermediate baffle 14 to restrict the space therebetween. The side walls or plates of the baffle means 16 overhang the respective intermediate baffles 14, so as to provide a restricted air passageway or throat between each intermediate baffle 14 and one of the diverging plates of said baffle means.

The chamber 5 above the baffle means 16 is divided by a vertical panel 20 into front and rear passages 21 and 22, respectively, with the panel disposed closer to the front than the rear wall of the chamber 5 and terminating at its lower end between the upper edges of the baffle means 16. Said passages 21 and 22 are provided on their front and rear walls, respectively, or in opposed relation to the panel 20, with inwardly and downwardly inclined baffles 24 and 25. These baffles are disposed intermediate the ends of said passages in vertical line with the respective throat passages opening at opposite sides of the baffle means 16 into the respective passages 21 and 22.

It is apparent from the foregoing that the cleaning chamber 5 is divided into a lower chamber or compartment into which the moisture laden air first enters from the throat 11 and is then baffled by the intermediate baffles 14 and the interposed inclined walls of the trough member 16 and its flanges and caused thereby to be divided and to pass through restricted throats into an upper chamber which is divided by the partition 20 into front and rear flues each in vertical register with one of said latter throats. The moisture or spray globules contained in the air impinge against the intermediate baffles 14, the under sides of the member 16 and the walls of the cleaning chamber 5, and is deposited thereon in the form of droplets which, as they accumulate, flow down the inclined surfaces of such parts and drip therefrom into the bottom of the chamber 5 onto the inclined bottom extension 7 and the inclined baffle plate 10 by which they are returned in a suitable manner to a tank 27 disposed in the bottom of the booth beneath the inlet to the chamber 5. The air in its passage through the restricted throats at each side of the baffle means 16 is baffled by the flanges 17 and 18, and after leaving such throats passes upward into the respective flues 21 and 22 where it is further baffled by the flanges 24 and 25, which collect the remaining moisture globules from the air and with them the paint and other impurities carried thereby. The moisture collecting on the under sides of the flanges 24 and 25 drips downward therefrom onto the respective intermediate baffles 14 from which they pass into the bottom of the chamber as above described, and the globules collecting on the partition 20 flow downward therefrom into the trough formed by the member 16. The arrangement of the baffles is such that low velocity areas are provided to facilitate the downward flow of water from the baffles and chamber walls to the storage tank 27. The water collected by the troughs formed by the members 10 and 16 may flow lengthwise therefrom and be discharged into the storage tank 27 through suitable end connections 31, 32 and 33, or in any other suitable manner. Water is supplied to the spray discharge pipe 12 from the water in the tank 27 through a suitable connection 28 in which a pump 29 for effecting such supply and discharge is provided. The air in entering the throat 11 from the chamber 3 passes over the water in the tank 27 and through the large volume of spray which falls downward into the tank from the throat 11.

In order to provide a water screen on the rear wall of the partition 6 to prevent the spray paint from accumulating thereon during spraying operation in the booth chamber 3, it is preferable to provide a water trough 30 at the upper end of such partition, which trough is supplied from the pump and source that supplies the spray pipe 12 and has an overflow at its rear edge over and down the rear side of said partition. Nothing novel is claimed for this feature.

We wish it understood that our invention is not limited to any specific construction, arrangement or form of the parts, as it is capable of numerous modifications and changes without departing from the spirit of the claims.

Having thus described our invention, what we claim as new and desire to secure by United States Letters Patent, is:

1. An air cleaning apparatus including a vertical chamber formed by a front wall and a rear wall joined by side walls, the lower portion of said rear wall being inclined downwardly and forwardly, a baffle plate extending rearwardly and upwardly from said front wall to form with said portion an entrance throat, means in said throat to introduce water into air passing therethrough, a downwardly inclined intermediate baffle extending a shorter distance from said rear wall than said lower portion thereof, and a second similar intermediate baffle extending a shorter distance from said front wall than said first named baffle plate, baffle means comprising two main flat plates diverging upwardly and outwardly from an apex lying in a line between the lower edges of such pair of intermediate baffles, the diverging plates on each side of said apex cooperating with one of said pair of intermediate baffles, extending from the adjacent wall and said end walls to form a passage rectangular in cross section, and a vertical panel spaced above said baffle means and dividing the upper portion of said chamber into vertical passages.

2. An air cleaning apparatus including a vertical chamber formed by a front wall and a rear wall joined by side walls, the lower portion of said rear wall being inclined downwardly and forwardly, a baffle plate extending rearwardly and upwardly from said front wall to form with said portion an entrance throat, means in said throat to introduce water into air passing therethrough, a downwardly inclined intermediate baffle extending a shorter distance from said rear wall than said lower portion thereof, and a second similar intermediate baffle extending a shorter distance from said front wall than said first named baffle plate, baffle means comprising two main flat plates diverging upwardly and outwardly from an apex lying in a line between the lower edges of such pair of intermediate baffles, the diverging plates on each side of said apex cooperating with one of said pair of intermediate baffles, extending from the adjacent wall and said end walls to form a passage rectangular in cross section, and a vertical panel spaced above said baffle means and dividing the upper portion of said chamber into vertical passages, the lower edge of said vertical panel lying between the upper edges of said plates, said vertical panel including laterally extending baffle flanges.

3. An air cleaning apparatus including a vertical chamber formed by a front wall and a rear wall joined by side walls, the lower portion of said rear wall being inclined downwardly and forwardly, a baffle plate extending rearwardly and upwardly from said front wall to form with said portion an entrance throat, means in said throat to introduce water into air passing therethrough, a downwardly inclined intermediate baffle extending a shorter distance from said rear wall than said lower portion thereof, and a second similar intermediate baffle extending a shorter distance from said front wall than said first named baffle plate, baffle means comprising two main flat plates diverging upwardly and outwardly from an apex lying in a line between the lower edges of such pair of intermediate baffles, the diverging plates on each side of said apex cooperating with one of said pair of intermediate baffles, extending from the adjacent wall and said end walls to form a passage rectangular in cross section, and a vertical panel spaced above said baffle means and dividing the upper portion of said chamber into vertical passages, and inwardly and downwardly inclined baffles on the front and rear walls of said chamber at opposite sides of said vertical panel in spaced relation thereto.

4. An air cleaning apparatus including a vertical chamber formed by a front wall and a rear wall joined by side walls, the lower portion of said rear wall being inclined downwardly and forwardly, a baffle plate extending rearwardly and upwardly from said front wall to form with said portion an entrance throat, means in said throat to introduce water into air passing therethrough, a downwardly inclined intermediate baffle extending a shorter distance from said rear wall than said lower portion thereof, and a second similar intermediate baffle extending a shorter distance from said front wall than said first named baffle plate, baffle means comprising two main flat plates diverging upwardly and outwardly from an apex lying in a line between the lower edges of such pair of intermediate baffles, the diverging plates on each side of said apex cooperating with one of said pair of intermediate baffles, extending from the adjacent wall and said end walls to form a passage rectangular in cross section, and a vertical panel spaced above said baffle means and dividing the upper portion of said chamber into vertical passages, one of said diverging plates having a flange extending downwardly therefrom and the other having a flange extending rearwardly from its upper edge toward one of said intermediate baffles.

5. An air cleaning apparatus including a vertical chamber formed by a front wall and a rear wall joined by side walls, the lower portion of said rear wall being inclined downwardly and forwardly to form with a portion of said front wall an unobstructed entrance throat, means in said throat to introduce water into air passing therethrough, a downwardly inclined intermediate baffle extending a shorter distance from said rear wall than said lower inclined portion thereof, and a second similar intermediate baffle extending from said front wall, baffle means comprising two main flat plates diverging upwardly and outwardly from an apex lying in a line between the lower edges of such pair of intermediate baffles, the diverging plates, on each side of said apex, cooperating with one of said pair of intermediate baffles extending from the adjacent wall and said end walls, to form a passage rectangular in cross section, and a vertical panel spaced above said baffle means and dividing the upper portion of said chamber into vertical passages, and inwardly and downwardly extending baffles on the front and rear walls of said chamber at opposite sides of said vertical panel and in spaced relation thereto.

ALBERT R. CLARK.
JAMES C. BUCK.
ROBERT V. DE VRIES.